United States Patent [19]

Harvey et al.

[11] Patent Number: 5,101,407
[45] Date of Patent: Mar. 31, 1992

[54] MULTIPLE-ACCESS COMMUNICATIONS SYSTEM

[75] Inventors: John D. Harvey, Ridgeway, Old Hardenhuish Lane, Chippenham, Wiltshire; Philip Whitehead, Latche End, Orchard Avenue, Tickenham, Nr. Clevedon, England

[73] Assignees: Hitachi, Ltd., Nippon Hoso Kyokai,; JPX; Nippon Hoso Kyokai, both of Tokyo, Japan

[21] Appl. No.: 438,485
[22] PCT Filed: Apr. 20, 1989
[86] PCT No.: PCT/GB89/00422
§ 371 Date: Feb. 14, 1990
§ 102(e) Date: Feb. 14, 1990
[87] PCT Pub. No.: WO89/10669
PCT Pub. Date: Nov. 2, 1989

[30] Foreign Application Priority Data

Apr. 20, 1988 [GB] United Kingdom ............... 8809259

[51] Int. Cl.$^5$ ........................ H04J 3/16; H04B 7/26
[52] U.S. Cl. ............................ 370/95.3; 370/95.1; 455/54; 455/56
[58] Field of Search ............... 370/95.1, 95.2, 95.3, 370/85.7, 85.8, 91, 92, 93, 104.1; 455/53, 54, 55, 56, 33, 34, 49, 88, 89; 340/825.03, 825.06, 825.36, 825.44; 379/58, 59, 60, 63

[56] References Cited

U.S. PATENT DOCUMENTS

| | | | |
|---|---|---|---|
| 4,573,206 | 2/1986 | Grauel et al. | 455/56 |
| 4,612,637 | 9/1986 | Davis et al. | 370/95.3 |
| 4,644,534 | 2/1987 | Sperlich | 370/95.3 |
| 4,759,016 | 7/1988 | Otsuka | 370/95.3 |
| 4,901,313 | 2/1990 | Fujikura et al. | 370/95.1 |
| 4,949,395 | 8/1990 | Rydbeck | 370/95.3 |

FOREIGN PATENT DOCUMENTS

| | | |
|---|---|---|
| 0111971 | 6/1984 | European Pat. Off. . |
| 0177094 | 4/1986 | European Pat. Off. . |
| 0307962 | 3/1989 | European Pat. Off. ......... 455/53 |
| 2376570 | 7/1978 | France . |

OTHER PUBLICATIONS

P. J. Mabey et al., "UK Trunking System Signaling Standard-Protocol Aspects", The Journal of the Institution of Electronic and Radio Engineers, vol. 57, No. 3, May/Jun. 1987, IERE, pp. 119-124.

Primary Examiner—Douglas W. Olms
Assistant Examiner—Alpus H. Hsu
Attorney, Agent, or Firm—Young & Thompson

[57] ABSTRACT

A multiple access communications system for use between a base and a plurality of substations and having a first channel for transmission of data from the base to the substations and a second channel for transmission of data from the substation to the base. The system has, in use, provision at the base and/or substations for assigning each of the substations to one of a plurality of groups, and for allocating, from the base, each of a plurality of slots in the second channel to a particular group. There is provision at the base for reporting to the substation via the first channel the number of substations in each group, and there are analyzing means at each substation for analyzing the number of substations in each of the groups and for making a judgement based on those numbers as to which group to assign each respective substation to in order for that substation to communicate next with the base in the slot or slots allocated to that group.

24 Claims, 2 Drawing Sheets

MULTIPLE-ACCESS COMMUNICATIONS SYSTEM

TECHNICAL FIELD

This invention relates to multiple access communication systems and a method of operating the same, especially such systems which allow communication of data between one or more base stations and a plurality of substations or mobiles.

Multiple access communication systems and in particular those employing mobile radio channel assignment are well known. Problems associated with such systems include difficulties in allowing the substations randomly to access the base station especially at busy periods. Simultaneous attempts at access by two or more substations can lead to a collision and mutilation of the data in question and subsequent attempts at access can cause an increasing number of collisions, further mutilation and ultimately instability of the whole system.

A polling system under which a substation communicates with a base station only on request by the base station can be secure and allow high capacity of use but suffers from the disadvantage of lengthy delays for any substations waiting to transmit.

Various attempts have been made to try to overcome the problems associated with wholly random access systems and with polling systems and these have centered on controlling the timing and/or manner of access of the base station by the substation through the use of prearranged protocols.

One of the first such protocols was termed "Pure Aloha" under which a substation transmits a request to the base station to transmit data and waits for an acknowledgment of the request. If none is forthcoming, the substation waits a random time before resubmitting the request.

A modified protocol was termed "Slotted Aloha" under which users of the system were allowed to transmit requests within a discrete timeslot. A related protocol was termed "Framed Aloha" under which the base station transmitted a message on a signalling channel to indicate which timeslots (arranged within "frames" containing a predetermined number of time slots) would be available to substations for making requests. However, all such systems generally were not particularly efficient under normal traffic conditions and became unstable under heavy traffic conditions.

A still further protocol termed "Dynamic Frame Length Aloha" attempted to take account of varying traffic conditions by varying the number of timeslots per frame on the basis of an evaluation of the level of use made of the previous frame. However, there were again problems with this protocol because of the limitations dictated by the system on the degree of variation of the number of slots in a frame and on the complexity of the systems employing the protocol.

DISCLOSURE OF THE INVENTION

The present invention is based on a protocol which can deal effectively with multi-access communication without resort to the complexity of a variable number of slots per frame and generally provides an efficient communication system.

In accordance with the invention, there is provided a multiple access communications system for use between a base and a plurality of substations and having a first channel for transmission of data from the base to the substations and a second channel for transmission of data from the substation to the base, wherein the system has, in use:

i) means for arranging for the substations and prospective substations to be split into a plurality of groups,
ii) means for assigning each of a plurality of slots in the second channel to a particular group,
iii) means for the base to inform the substations via the first channel of the number of substations in the groups, and
iv) means for each substation to analyze the numbers of substations in each of the groups and to make a judgment based on these numbers as to which group to associate itself with in order to next communicate with the base in the slot or slots assigned to that group.

On joining the system, substations may be assigned by the base to the groups on a rolling basis, but substations leaving the system during any particular period of operation are not automatically replaced by another substation joining the system. In this way, there tends to be a random, varying, number of substations in each group at a given time.

Alternatively, however, on joining the system, a substation may assign itself to a particular group by reference to the numbers of substations in each group.

In general operation of the system, each substation is entitled randomly to attempt to communicate with the base in the slot assigned to its group.

As with other random access systems, any communication from a substation to the base station which is not acknowledged because, for example, of mutilation caused by collision between two substations of the same group attempting simultaneously to use their common assigned slot, would normally be re-transmitted.

In the event of failure to transmit, each substation knows from the base the number of substations in each group and hence, on the basis that collisions are least likely in the lowest populated groups, knows the slots it can use with the greatest chance of successful transmission.

The system is set up, therefore, to allow a substation in a given group to use slots assigned to other groups in the event of collision or other unsuccessful transmission to base.

Preferably, however, because of the likelihood of other substations (especially the one causing the collision with the substation in question) trying simultaneously to use a slot of the lowest populated group, the system possesses a random number generator or other suitable means to determine either the number of timeslots which must pass before the next attempt to transmit is made, and/or which slot or slots from a "pool" of slots of low population numbers are used to make the next attempt to transmit.

There may be occasions when traffic flow in the system is being disrupted owing to, for example, too many substations attempting to use slots assigned to a particular group or to there being a general backlog of data waiting to be transmitted.

In one embodiment, therefore, means are built into the system to allow the base artificially to amend the number of substations in a group so as to deter or encourage use of slots assigned to that group, especially by substations outside the group in question. Thus, if in a group having a maximum population of sixteen substations the actual number of substations is eight, the base may artificially indicate a population of, say, fifteen or sixteen to deter use of slots assigned to that group.

In another embodiment, the system is designed so that, under normal traffic flow conditions, a proportion of the theoretical number of available groups (hereafter called "special" groups) remains unused, i.e. no substations are allocated to them. This can be done by assigning an especially high population number to a group, for example, a number above the maximum population normally allowed.

In such an embodiment, it is advantageous for the base to have means to encourage use of the special groups by individual substations for the purpose of, for example, sending a backlog of data, but thereafter to discourage other substations by immediately amending the level of allocated substations until the backlog has been cleared.

The system may also respond so as to give priority to a substation that needs to transmit an urgent message at any time by allowing that substation to associate itself with a group having a low population of substations so that the probability of a successful transmission is increased. This can be achieved in a similar manner as when a substation prepares to re-transmit following a failure.

DESCRIPTION OF THE DRAWINGS

The invention will now be described by way of example with reference to the accompanying drawings in which.

THE BEST MODE OF CARRYING OUT THE INVENTION

The illustrated system comprises a base station A and 'n' substations or mobiles Bl to Bn. The base station A has a radio transmitter Tx through which it communicates with all of the substations on a first radio channel C1, and the substations Bl to Bn all communicate with the base station A on a second radio channel C2 which is received by a radio receiver Rx at the base station. A control processor P1 is provided at the base station and responds to communications received on channel C2 from the substations, and transmits corresponding communications on channel C1 to the substations.

Figure 1:
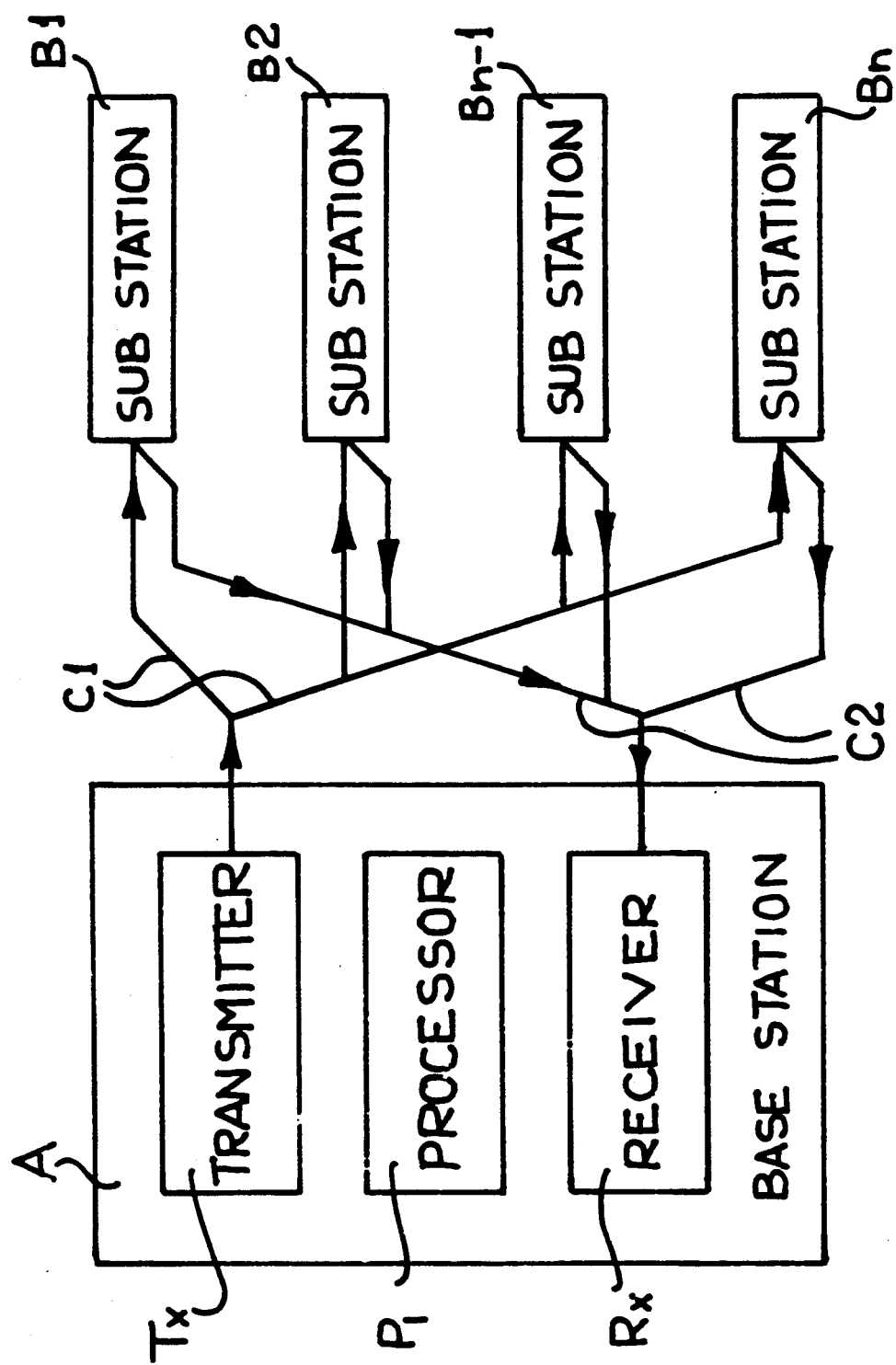
FIG. 1 is a schematic diagram of a multiple access communications system according to one embodiment of the invention.
Figure 2:
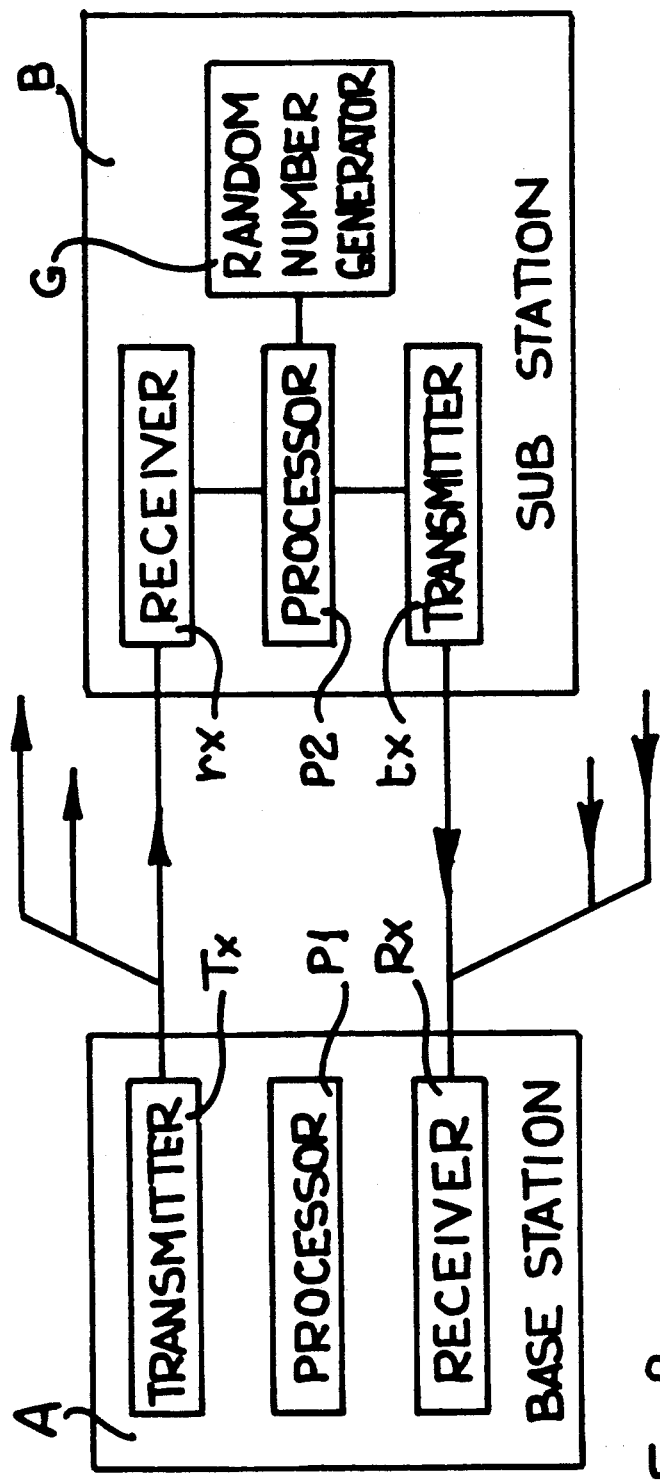
FIG. 2 is a more detailed schematic diagram of the base station and one substation of the system of FIG. 1.

Each substation Bl to Bn, as shown in FIG. 2, comprises a radio receiver rx to receive communications on channel C1 from the base station A, and a radio transmitter tx to transmit communications on channel C2 to the base station. A control processor P2 responds to data received from the base station A and serves to determine the time slots used by the substations to communicate with the base station on channel C2.

Figure 3:
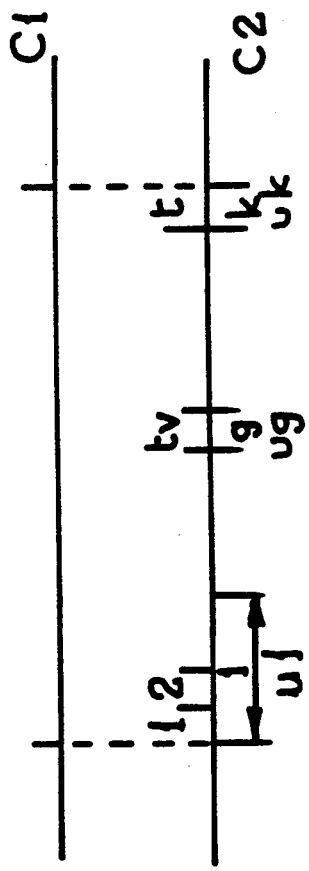
FIG. 3 is a schematic representation of the frame composition of the two channels in the system of FIG. 1 for the transmission of data from the base to a plurality of substations and from each substation to the base.

Both radio channels C1 and C2 transmit data arranged within frames, as shown in FIG. 3, and each frame in channel C2 is subdivided into t slots for the transmission of data from the substations Bl to Bn. Generally, all the frames of each, and preferably the frames of both channels, are of fixed length or integral multiples thereof, and the frames of both channels are synchronized either in phase, as shown in FIG. 3, or out of phase.

In operation of the system, the substations Bl to Bn using the system at any one time are divided into K groups 1 to k, and each group is assigned to a particular one or more of the slots 1 to t in the second channel C2. Each substation in a group then makes use of the same assigned slot or slots to communicate with the base station A.

The group to which each substation is assigned is determined by data which is transmitted from the control processor P1 to the control processor P2 and include data corresponding to the number ul to uk of substations currently assigned to each of the groups 1 to k. For example, group g, shown in FIG. 3, contains Ug substations which all use the slot tv, and these group population data Ug are stored in both control processor P1 and P2.

If a substation fails to communicate successfully with the base station A on the first attempt or after a predetermined number of attempts using one or more of the slots 1 to t assigned to its group, then the substation can improve the probability of a successful re-transmission in a subsequent attempt by selecting a time slot from a pool of time slots using a random number generator G, as shown in FIG. 2, or a distribution algorithm in the control processor P2.

The pool of time slots can be drawn from those one or more groups within a particular frame and/or those of a group in more than one frame. For example, a pool could be composed of the slots assigned to two groups over two consecutive frames, say group 5 with one slot and group 9 with two slots, giving a pool of six slots.

The number of slots in the pool can be increased with successive communication failures by increasing either the number of frames and/or the number of groups within a frame so that the probability of a successful communication is progressively increased with the number of attempts. This increase in probability of success is obtained at the expense of the first time success rate of those substations whose groups and frames are actually used in the pool.

The selection of particular groups which are used to form a pool would normally start with any special groups reserved by the control processor P1 of the base section A, a special group being reserved by assigning an especially high population number U to the group, for example, a population number above the maximum population number normally allowed by the control processor P1. After special groups, the pool would draw on those groups with no or few substations assigned to them. The pool could then be expanded by including the group to which the particular substation is currently assigned, and then in a progressive manner those groups with higher populations of substations, although it is unlikely that groups with more than a few substations would ever be used for this purpose.

In some operating conditions where, for example, too many substations attempt to use slots assigned to a particular group, the control processor P1 of the base station A can be adapted to set the substation population U for that group artificially high so as to deter use by substations from other groups.

In carrying out their operations it will be appreciated that the processors P1 and P2 allocate information and- /or identification codes to the slots. Such information and/or identification codes commonly include:
  i) means to synchronize the slots of the channels either "in phase", i.e. so that the slots of the channels begin and end simultaneously, or "out of phase", i.e. so that the slots of the channels are offset by a predetermined amount of time,
  ii) means to identify the group to which the slot has been assigned,
  iii) control information such as a destination address or addresses,
  iv) source information if, for example, the origin of data (or whatever) being sent in the slot would otherwise be unclear.

The use of such information/identification means associated with the slots is known to those skilled in the art.

We claim:

1. A multiple access communications system for use between a base and a plurality of substations and having a first channel for transmission of data from the base to the substations and a second channel for transmission of data from the substation to the base, wherein the system has, in use:
  i) assigning means at the base for assigning each of the substations to one of a plurality of groups,
  ii) allocating means at the base for allocating each of a plurality of slots in the second channel to a particular group,
  iii) reporting means at the base for reporting to the substations via the first channel the number of substations in each group, and
  iv) analyzing means at each substation for analyzing the numbers of substations in each of the groups and for making a judgment based on these numbers as to which group to assign each respective substation to in order for that substation to communicate next with the base in the slot or slots allocated to that group.

2. A system as claimed in claim 1, wherein said analyzing means assigns each substation (Bl to Bn) to a particular group (l to k) based on said judgment of numbers of substations in each group in order that each substation can re-transmit to the base (A) following a failure to communicate.

3. A system as claimed in claim 1, wherein said analyzing means assigns each substation (Bl to Bn) to a particular group (l to k) based on said judgment of numbers of substations in each group in order that each substation can communicate an urgent message to the base (A).

4. A system as claimed in claim 1, wherein said analyzing means assigns said substation to that particular group (l to k) having the lowest number (ul to uk) of substations in it.

5. A system as claimed in claim 4, wherein each substation (Bl to Bn) has random selection means (G) that operates at random to assign said substation with one of two or more groups (l to k) that have the same lowest number (ul to uk) of substations in them.

6. A system as claimed in claim 1, wherein each random substation (Bl to Bn) has random selection means (G) that operates at random to introduce a time delay in allowing a substation to communicate with the base (A) following a first or subsequent failure of attempt to communicate with the base station.

7. A system as claimed in claim 1, wherein said assigning means (P1) is adapted to assign a nominal number (ul to uk) of substations (Bl to Bn) to any group which differs from the actual number of substations in group, thereby to influence said assignment of further substations to that group.

8. A system as claimed in claim 1, wherein said assigning means (P1) is adapted to assign a nominal number (ul to uk) of substations (Bl to Bn) to any group (l to k) which number is above a maximum possible number of substations in a group so as to indicate that these are special groups for use by the substations under predetermined conditions.

9. A system as claimed in claim 1, wherein said judgment based on numbers of substations (Bl to Bn) in each of the groups (l to k) involves the analyzing means selecting one or more groups so as to produce a pool of slots (t) associated with these selected groups, random selection means at each substation then selecting one of the slots (t) in said pool at random and assigning the respective substation to this selected slot in order to communicate next with the base.

10. A system as claimed in claim 9, wherein the analyzing means selects groups so as to produce a progressively larger pool of slots with successive failures to communicate by a substation, thereby to increase the probability of a successful communication at each successive attempt to communicate following a failure.

11. A system as claimed in claim 9, wherein said one or more groups selected are those with lower numbers of substations in them.

12. A system as claimed in claim 9, wherein said one or more groups selected include a special group reserved by the assigning means assigning a high nominal number of substations to the group.

13. A system as claimed in claim 1, in which said assigning means (P1) is adapted to assign any substation (Bl to Bn) joining the system to said one group (l to k) according to the number of substations in each group.

14. A method of operating a multiple access communications system for use between a base and a plurality of substations and having a first channel for transmission of data from the base to the substations and a second channel for transmission of data from the substation to the base, comprising the following steps:
  i) assigning each of the substations to one of a plurality of groups (l to k),
  ii) the base allocating each of a plurality of slots (l to t) in the second channel to a particular group (l to k),
  iii) the base reporting to the substations (Bl to Bn) via the first channel (C1) the number of substations in each group (l to k), and
  iv) each substation (Bl to Bn) analyzing the number (Ul to Uk) of substations in each of the groups l to k) and making a judgment based on these numbers as to which group (l to k) to assign itself to in order next communicate with the base (A) in the slot or slots (t) assigned to that group.

15. A method as claimed in claim 14, wherein each substation (Bl to Bn) assigns itself to a particular group (l to k) based on said judgment of numbers of substations in each group in order to re-transmit to the base (A) following a failure to communicate.

16. A method as claimed in claim 14, wherein each substation (Bl to Bn) assigns itself to that particular group (l to k) having the lowest number (ul to uk) of substations in it.

17. A method as claimed in claim 14, wherein said judgment based on numbers of substations (Bl to Bn) in each of the groups (l to k) involves selecting one or more groups so as to produce a pool of slots (t) associated with these selected groups, and then selecting one of the slots (6) in said pool, the respective substation using this selected slot in order to next communicate with the base.

18. A method as claimed in claim 17, wherein groups are selected so as to produce a progressively larger pool of slots with successive failures to communicate by a substation, thereby to increase the probability of a successful communication at each successive attempt to communicate following a failure.

19. A method as claimed in claim 17, wherein said one or more groups selected are those with lower numbers of substations in them.

20. A method as claimed in claim 14, wherein said one or more groups selected include a special group reserved by the base assigning a high nominal number of substations to the group.

21. A method as claimed in claim 14, wherein a nominal number (u1 to uk) of substations (B1 to Bn) is assigned to any group which differs from the actual number of substations in the group, thereby to influence assignment of further substations to that group.

22. A method as claimed in claim 14, wherein the base assigns each of the substations to one of a plurality of groups.

23. A method as claimed in claim 14, wherein the substations each assign themselves to one of a plurality of groups on joining the system.

24. A multiple access communications system for use between a base and a plurality of substations and having a first channel for transmission of data from the base to the substations and a second channel for transmission of data from the substation to the base, characterized in that the system has, in use:
   i) assigning means at the substations for assigning each of the substations to one of a plurality of groups,
   ii) allocating means at the base for allocating each of a plurality of slots in the second channel to a particular group, and
   iii) reporting means at the base for reporting to the substations via the first channel the number of substations in each group,
   the assigning means analyzing the numbers of substations in each of the groups and making a judgment based on these numbers as to which group to assign each substation to on joining the system.

* * * * *